United States Patent [19]
Lopes, Jr. et al.

[11] 3,719,922
[45] March 6, 1973

[54] DIGITAL CAMERA

[76] Inventors: Louis A. Lopes, Jr., 342 South Craig Avenue, Pasadena, Calif. 91107; Owen F. Thomas, 475 Sturdevant Drive, Sierra Madre, Calif. 91024

[22] Filed: June 24, 1971

[21] Appl. No.: 156,256

[52] U.S. Cl. ............340/5 MP, 73/67.5 H, 340/5 H, 343/17
[51] Int. Cl. ................................................G01s 9/66
[58] Field of Search ............340/3 R, 5 R, 5 H, 5 MP; 73/67.5 H; 343/17

[56] References Cited

UNITED STATES PATENTS 3,484,740  12/1969  Cook ....................................340/5 H
3,631,384  12/1971  Smith, Jr. ............................340/5 H Primary Examiner—Richard A. Farley
Attorney—Richard S. Sciascia et al.

[57] ABSTRACT

A digital camera capable of forming a picture of pattern of objects either radiating or reflecting energy, which includes an oscillator which can generate a ping-type or continuous-wave signal, which may be amplified and if the target is not self-radiant, transmitted to a stationary illuminator, which "illuminates" the target. The target reflects or radiates energy to a rectangular array or matrix of transducer elements, each of which corresponds to an element of the object observed, and each of which is connected to an analog-to-digital converter and then to a digital computer, or to logical circuitry arranged to form a digital computation. The computer determines the phase and amplitude from each element at a frequency of interest, stores the values in an ordered array corresponding to the transducer array, and performs the mathematical operation known as a two-dimensional finite Fourier transform on the values to produce a new array of values in complex notation. A similar array of absolute values derived from the complex values, when fed into a printer, forms a pictorial representation of the target which corresponds to the intensities of the signal sources of the various parts of the target.

14 Claims, 15 Drawing Figures

THE PLANE IN WHICH THE HYDROPHONES ARE LOCATED.

BEAM PATTERN, N=8

NORMALIZED FOURIER TRANSFORM AS A FUNCTION OF ANGLE OF THE SIGNAL SOURCE.

INVENTORS.
LOUIS A. LOPES, JR.,
OWEN H. THOMAS,

By ERVIN F. JOHNSTON,
ATTORNEY
JOHN STAN,
AGENT

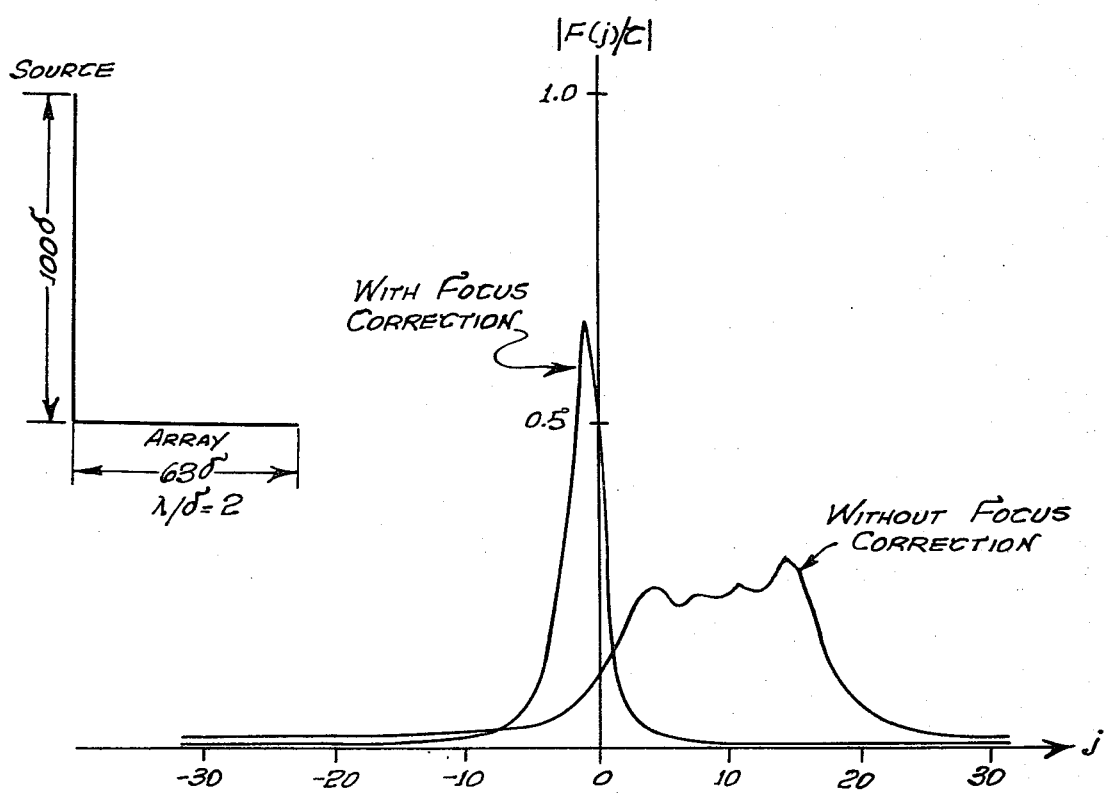
FIG. 3. IMPROVEMENT IN RESPONSE BY FOCUS CORRECTION.
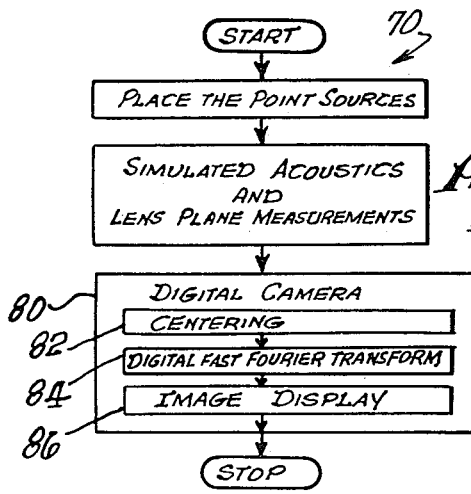
FIG. 5. BASIC PROGRAM FOR SIMULATING THE DIGITAL CAMERA.
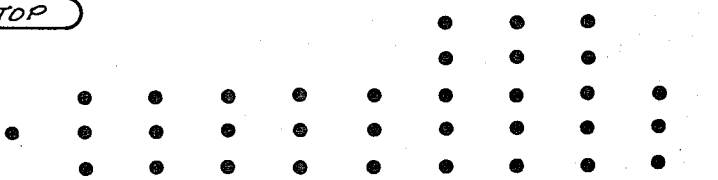
FIG. 6.
POINT SOURCE SET SIMULATING THE SHAPE OF A SUBMARINE.

BASIC ELEMENTS OF THE DIGITAL CAMERA

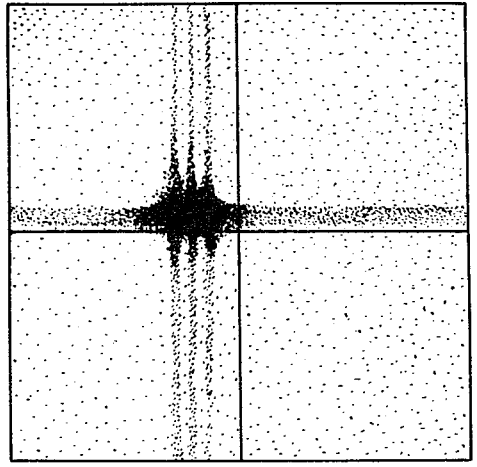
FIG. 7. IMAGE WITH HYDROPHONE SPACING OF $\lambda/2$.
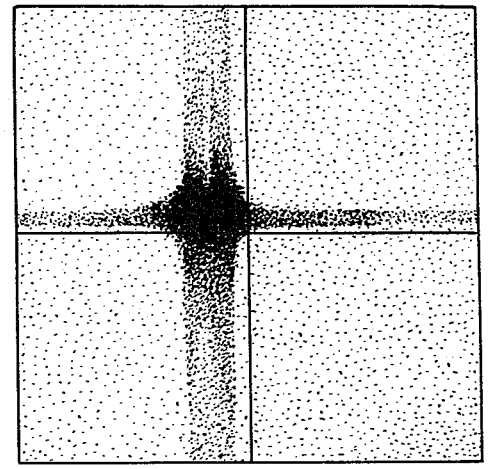
FIG. 8. IMAGE WITH HYDROPHONE SPACING OF $\lambda/2$.
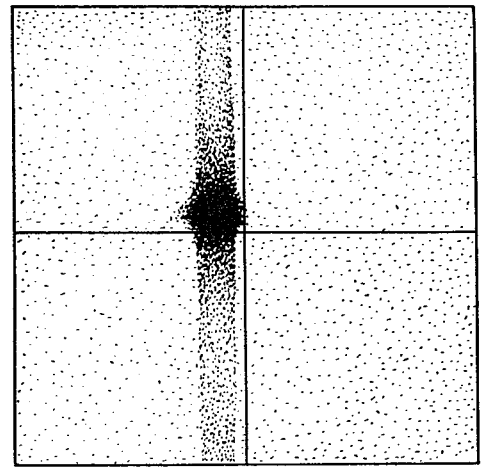
FIG. 9. IMAGE WITH HYDROPHONE SPACING OF $\lambda/2$.
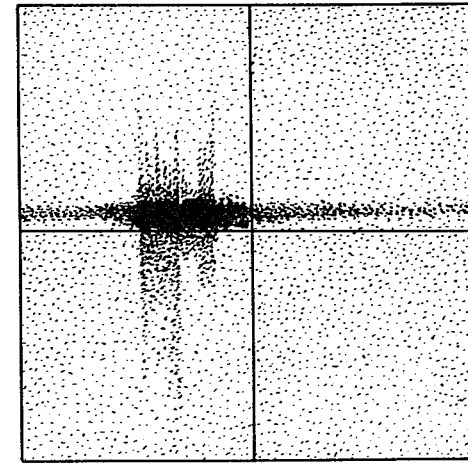
FIG. 10. IMAGE WITH HYDROPHONE SPACING OF $\lambda$.

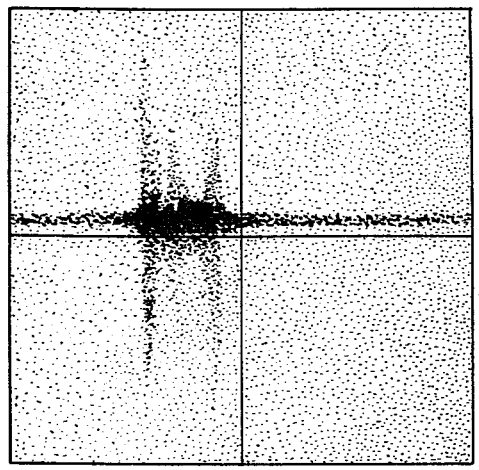
FIG. 11. IMAGE WITH HYDROPHONE SPACING OF λ.
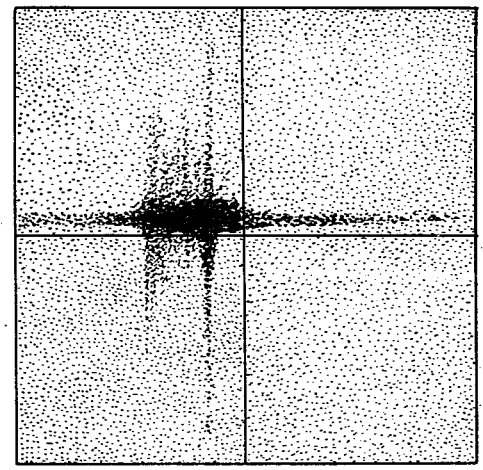
FIG. 12. IMAGE WITH HYDROPHONE SPACING OF λ.
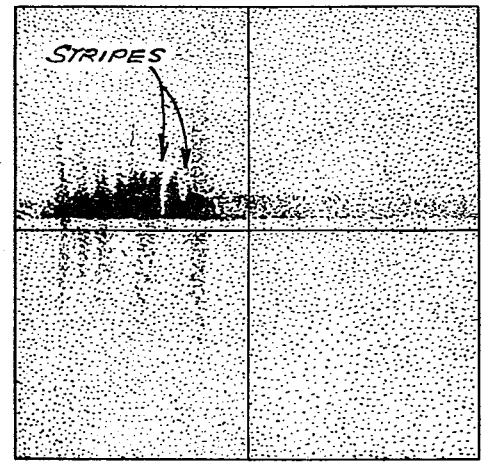
FIG. 13. IMAGE WITH HYDROPHONE SPACING OF 2λ.
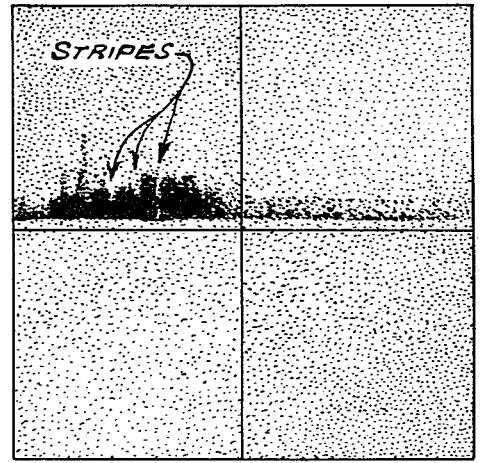
FIG. 14. IMAGE WITH HYDROPHONE SPACING OF 2λ.
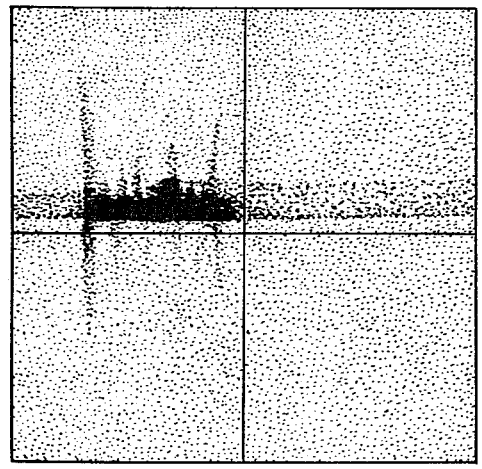
FIG. 15. IMAGE WITH HYDROPHONE SPACING OF 2λ.

DIGITAL CAMERA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a method for forming images by use of digital processing of the signals from a matrix of omnidirectional hydrophones, without the use of a physical lens. The mathematical foundation is presented, and the imaging system is explained as the response from a large set of thin directional beams. A simulated acoustic field was generated on the UNIVAC 1108 computer to demonstrate picture formation by the digital camera.

Acoustic imaging has the potential of providing pictures in which objects can be identified and multiple objects can be resolved, e.g., a sea mount would look different than a submarine, and a submarine would look different than a nearby decoy, digital imaging has flexibility in multiple frequency operation, time domain processing, focusing, and telephoto operation which are not readily available to imaging systems with physical lenses.

At each point of a matrix of receiving elements, i.e., hydrophones, the amplitude and phase are determined, giving a series of complex numbers. There is no obvious correlation between the series, or array, of complex numbers and the intensities of various points of the target. It is only after the Fourier transform is performed on the array of complex numbers that there results a correlation between the two.

Both the magnitude and phase must be known at each hydrophone; knowing only the magnitude is not sufficient. Performing a Fourier transform on only the magnitude of the signals at each of the hydrophones would also result in an array of complex numbers, but this array would not correspond to the intensities of the signal sources of various parts of the target.

The assembly of signals on the faces of the transducers, or hydrophones, form what is essentially the spatial Fourier transform of the source distribution. Then, if the inverse Fourier transform of the magnitude and phase distribution at the hydrophones is taken, the source distribution of the target area is obtained.

The discrete finite Fourier transform has been implemented as a fast Fourier transform, using what is known in the literature as the Cooley-Tukey fast Fourier transform (FFT) algorithm. The FFT algorithm is used rather than the conventional discrete Fourier transform because it requires less calculations, by an exponential factor, whereas use of the latter would require an impracticably large number of calculations, which would take so long that the system would be impractical.

At each hydrophone both the magnitude and the phase of each received signal may be determined. A pattern of the image may be constructed using only the phases or only the amplitudes, but it will not be an ideal image, that is, it will result in a deteriorated image.

For electromagnetic wave fields at optical frequencies there are many forms of cameras which use glass lenses to form an image which is recorded on a photosensitive film. For acoustic wave fields there are lenses made of a variety of materials to form acoustic images to be recorded with difficulty by a matrix of hydrophones. For microwave fields there are lenses, but there is no material suitable for recording a microwave image. Acoustic and microwave devices exist for scanning a field of view with a thin beam system, but the scan rate is slow. This invention eliminates the need for a lens, and uses a receiving matrix with spacing much larger than can be used in an image plane behind a lens.

In the prior art, the major effort in techniques for acoustic inspection has been devoted to formation of beams by phasing and shading of complex arrays of transducer elements. Modern sonar equipment uses sophisticated time and frequency processing of the beam outputs, but does not use spatial processing for image formation. Some effort has been devoted to acoustic imaging by use of lenses to form an image on a matrix of transducers, and preliminary imaging work has been done by holographic techniques.

SUMMARY OF THE INVENTION

The digital camera comprises an oscillator which produces a sinusoidal voltage to a power amplifier and illuminator. The oscillator and illuminator are not needed if the body radiates the proper range of frequencies. The object reflects or radiates energy to the array of receiving transducers. The array is composed of a large number of transducers connected through amplifiers and analog-to-digital (A/D) converters to a digital computer or equivalent logical circuitry. The A/D converters produce samples at a rate twice the highest frequency in the received signals, that is, at the Nyquist rate. The digital computer performs a spectral analysis on a sequence of time samples from each typical A/D converter to determine the complex number representing the phase and amplitude of each frequency being received. The digital computer selects the phase and amplitude of each frequency being received. The digital computer selects the phase and amplitudes from each typical element at a frequency of interest, stores the values in an array, and performs a two-dimensional finite Fourier transform on the values, producing a new array which is the image in complex notation. The absolute values of this new array may be output on a printer as an array of numbers representing intensity of the image at each resolution cell of the image. The digital computer then starts forming another image by performing a spectral analysis on the time samples from the A/D converters as above and repeats the operations required to output an image.

The digital camera has the advantage of operating on a variety of input signals to form images without a physical lens. Modification for operation in different media and wavelengths can be easily accomplished by changing the transducers in the receiving array, and by charging the A/D conversion rates, the digital camera can form images at many different frequencies if desired. The system herein disclosed used a continuous wave oscillator, but could be adapted for a ping-type projector. Since a digital computer may be a part of the system, the logical design can be easily expanded to allow time gating or waveform selection techniques in addition to the imaging operations. The time gating, or waveform selection, refers to gating the hydrophone inputs so that they are "open" to receive the desired signal from the target, but are "closed" when the unwanted signal due to reverberation is at the input to the hydrophone, that is, the reverberation is gated out.

OBJECTS OF THE INVENTION

An object of the invention is to provide a digital camera suitable for use at frequencies from sonar frequencies up to microwave frequencies.

Another object of the invention is to provide a digital camera which is not only able to detect the presence of an object, but is also able to determine the contributions by each individual signal source to the total received signals to be able to distinguish between objects having different signal source distributions.

Yet another object of the invention is to provide a digital camera which is able, by increasing the operating frequency, to cause a magnification in the resultant displayed image.

Other objects, advantages, and novel features of the invention will become apparent from the following detailed description of the invention, when considered in conjunction with the accompanying drawings, wherein:

BRIEF DESCRIPTION OF THE DRAWINGS

FIG. 3 is a pair of graphs showing the improvement in response to a single hydrophone by correction of the focusing.

FIG. 5 is a block diagram of a possible computer program to simulate the digital camera.

FIG. 6 is a point source set simulating the shape of a submarine.

FIGS. 7 through 9 are a set of submarine shape pictures wherein the hydrophones are separated by 1/2 wavelength.

FIGS. 10 through 12 are a similar set of pictures wherein the hydrophone elements are separated by one wavelength.

FIGS. 13 through 15 are a similar set of pictures wherein the hydrophone elements are separated by two wavelengths.

DESCRIPTION OF THE PREFERRED EMBODIMENTS

Figure 1:
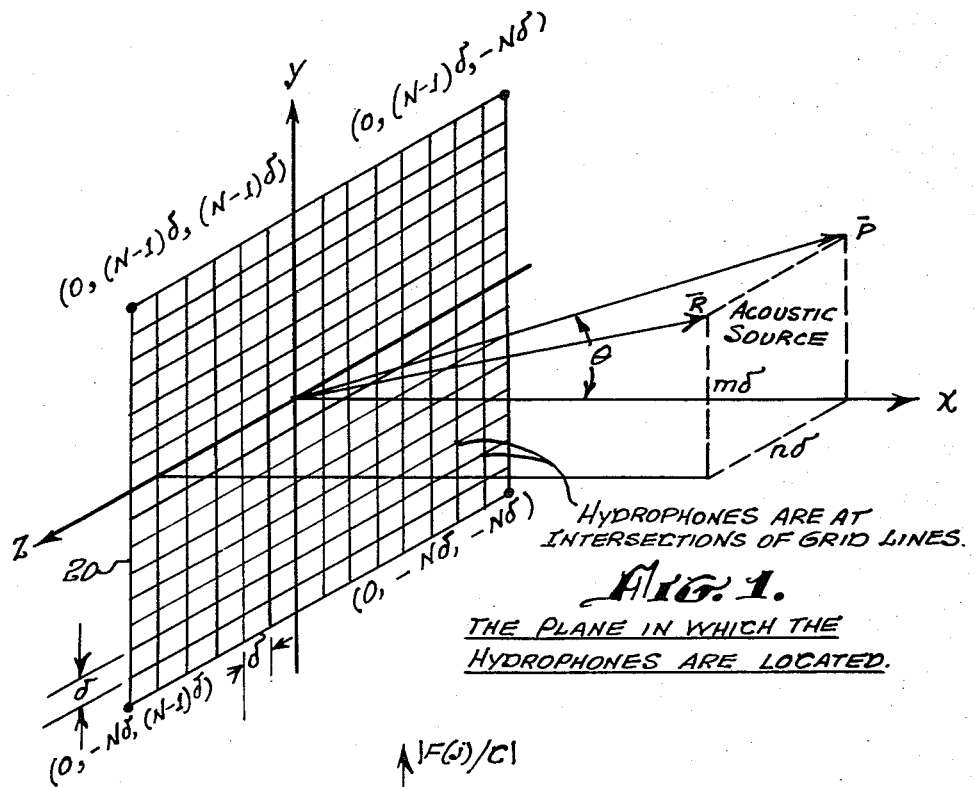
FIG. 1 is a diagrammatic view which shows the coordinates of the plane in which the hydrophones are located.

Referring now to FIG. 1, the receiving plane 20 for a digital acoustic camera is covered by an array of hydrophones, not shown, but assumed to be at the intersection of the various grid lines. All the hydrophones have the same directivity pattern, which has an axis of symmetry. The active forces of the hydrophones are all in a plane, with the axes of symmetry normal to the plane 20 and passing through the net points of a square grid. A Cartesian coordinate system is used with the positive $x$ axis normal to the plane 20 of the array, as shown in FIG. 1. The $y$ and $z$ axis are parallel to the set of grid lines. The centers of the hydrophone face are in the plane $x = 0$ at the points $$(y, z) = (m\delta, n\delta), m, n = -N, -N+1, \ldots N-1$$

where $4N^2$ is the number of hydrophones in the array and $\delta$ is the grid spacing.

Consider the output of the hydrophone at $(m\delta, n\delta)$ produced by a point source of strength $S$, wavelength $\lambda$, at a range $R$ from the origin of the coordinate system. A vector from the origin to the point source has direction cosines $\alpha$, $\beta$, $\gamma$). Assuming a homogeneous medium with no attenuation, the voltage output of a hydrophone at $(m\delta, n\delta)$ is represented in the complex form as $$L_{mn} = \frac{DSe^{-(2\pi i/\lambda)R_{mn}}}{R_{mn}} \qquad (1)$$

where $D$ is the directional voltage response of each individual hydrophone, and $R_{mn}$ is the range from the source to the hydrophone center. Thus $$R_{mn} = [(R\alpha)^2 + (R\beta - m\delta)^2 + (R\gamma - n\delta)^2] \qquad (2)$$

If $R$ is much greater than the array width $(N\delta)$, then $R_{mn}$ is given approximately by $$R_{mn} \approx R - (m\delta\gamma + n\delta\gamma) \qquad (3)$$

In this case, the following is approximately true:

$$L_{mn} = Ce^{(2\pi i/\lambda)\delta(m\beta + n\gamma)}, \qquad (4)$$

where $$C = \frac{DSe^{-(2\pi i/\lambda)R}}{R} \qquad (4a)$$

$C$ depends on the direction, but not on the coordinates $(m, n)$, since the response $D$ is the same for all hydrophone elements.

For simplicity, consider the one dimensional case with $2N$ hydrophones along the $y$ axis and a source at the point P in the $x, y$ plane, as shown in FIG. 1. Let the angle between the radius vector P to the source and the $x$ axis be denoted by $\theta$, as shown. Then, from Eq. 4 the hydrophone outputs are $$L_{m0} = Ce^{(2\pi i/\lambda)\delta m \sin \theta}, m = -N, -N+1, \ldots N-1 \qquad (5)$$

Define $$\theta_0 = \lambda/(2N\delta) \qquad (6)$$

then $$L_{m0} = Ce^{(\pi i/N)m(\sin \theta)/\theta_0} \qquad (7)$$

The concept of phase-shifting and summing the signals from an array of hydrophones in order to form a beam is a familiar one. The acoustic image of a source distribution may be thought of as being painted by a large number of thin beams. This analogy will be emphasized. The imagining, or beam-forming, operation consists of operating on Eq. 7 with a finite Fourier transform, whereupon the following equation is obtained:

$$F(j) = \frac{1}{2N} \sum_{m=-N}^{N-1} L_{m0} e^{(-\pi i/N)jm}$$

$$= \frac{iC}{N} \frac{\sin \pi \left(\frac{\sin \theta}{\theta_0} - j\right)}{e^{(\pi i/N)(\sin \theta/\theta_0 - j)} - 1} \qquad (8)$$

It will be observed that the limits on the sum correspond to the coordinates of the limits of the planar array in FIG. 1, that is, from $-N$ to $N-1$ in both the vertical and horizontal directions.

In Eq. 8, $j$ represents the number of the beam. $j$ also has the range of values from $-N$ to $N-1$. The beam is what results from processing the signal received by a linear array of hydrophones from one signal source. The received signals are processed according to Eq. 8, which represents a set of responses, $j$ responses, $j$ being a parameter. There are $2N$ beams, inasmuch as there are $2N$ linear arrays of hydrophones, considered in either the vertical or horizontal direction, as may be seen in FIG. 1.

Taking the absolute value of Eq. 8, the following is obtained:

$$|F(j)| = |0| \frac{\sin \pi \left(\frac{\sin \theta}{\theta_0} - j\right)}{2N \sin \frac{\pi}{2N} \left(\frac{\sin \theta}{\theta_0} - j\right)} \quad (9)$$

The latter expression represents the beam pattern of the beam pointed in the direction $$\theta = \sin^{-1}(j\theta_0) \quad (9a)$$

or it represents the intensity at resolution element $j$ of the image. Let $$\omega = (\sin \theta/\theta_0) - j \quad (9b)$$

Then $$|F(j)|/|C| = \sin \pi\omega/2N \sin \pi\omega/2N \quad (10)$$

represents the intensity at resolution element $j$ or beam $j$ for a source in direction $\theta$.

For large $N$, the right side of Eq. 10 is very much like the familiar $(\sin x)/x$ function if $|x| \leq N$. It differs, however, in that it is periodic with period $2N$. The normalized graph of the function for $N = 8$ is shown in FIG. 2.

Figure 2:
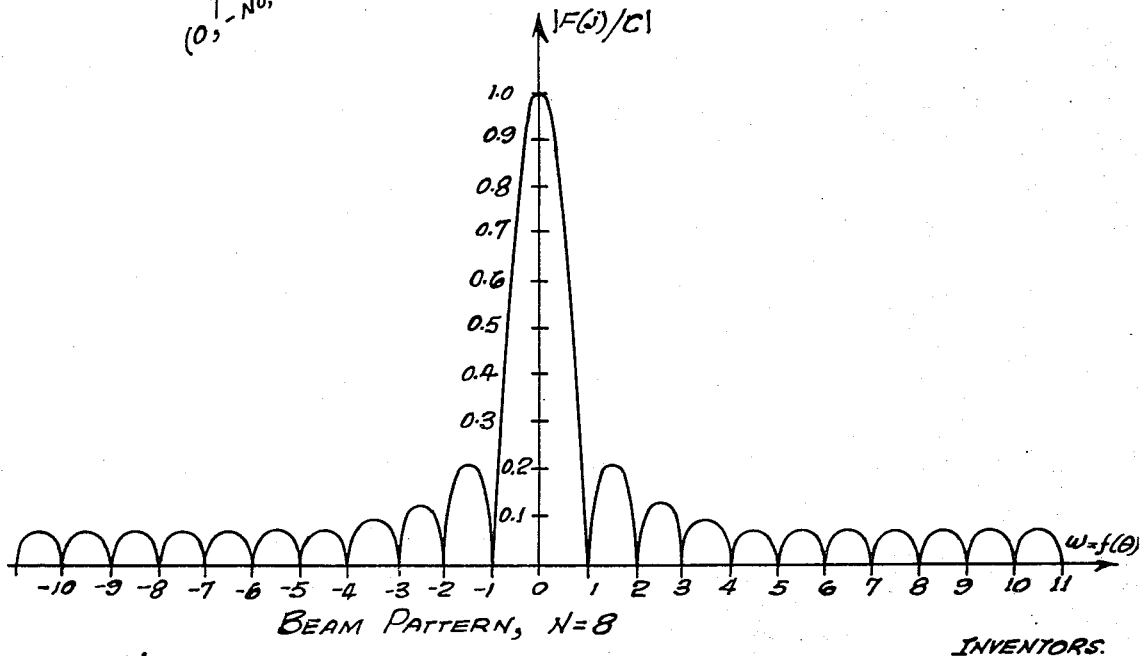
FIG. 2 is a chart which shows the normalized response of all of the hydrophones in a linear array of hydrophones, for example, of all the hydrophones located along the y axis, as shown in FIG. 1.

The response shown in FIG. 2 is that for a single signal source along one of the axes. For example, it could represent a signal source along the $x$-axis just below the point P, or a signal source just below the point R in the $xz$-plane. If the source is not in the $xz$-plane, then, as is described hereinbelow, the signal source must be properly centered in order that the various signal components may be added properly.

FIG. 2 represents the normalized output of the $j$-th beam, where $j$ has the values from $-N$ to $N-1$, where there is a source whose position varies as the angle $\theta$, shown in FIG. 1, and, therefore, as $\omega$ varies in FIG. 2, since $\omega$ is a function of $\theta$ through Eq. 9b.

It should be pointed out that FIG. 2 shows only the relative magnitudes as a function of $\omega$. The phase angle may be obtained from Eq. 8.

A beam, or an image resolution element, is formed for each $j = -N, -N+1, \ldots N-1$. By use of Eq. 6, a source is at the center of the $m^{th}$ beam when $$\sin \theta = m\theta_0 = m\lambda/2N\delta \quad (11)$$

There are two cases to be considered, $\lambda/\delta > 2$ and $\lambda/\delta \leq 2$. If $\lambda/\delta > 2$ there is a one-to-one correspondence between $m$ and an angle $\theta$ satisfying Eq. 11 when $$-N \leq m \leq N \text{ and } -90° < \theta < 90°$$

Hence there is no ambiguity in the direction of any of the main lobes of the beams, or each resolution element has its highest response to a source in a single direction. In the case of $\lambda/\delta \leq 2$ the correspondence is no longer one-to-one. For example, because of the ratio in Eq. 10, a source at an angle $\theta = \sin^{-1}(\lambda/2\delta)$ gives the same output from all the hydrophones as a source at an angle $\theta = -\sin^{-1}(\lambda/2\delta)$.

It may be said that the unambiguous field of view is decreased as ($\lambda/\delta$) is decreased. It may be seen from Eq. 11 that if $\lambda/\delta > 2$ the maximum possible value of $m$ is $2N\delta/\lambda > N$. Hence there are beams whose main lobes are never activated. When $\lambda/\delta = 2$, the field $-90° \leq \theta \leq 90°$ is covered, with ambiguity at the points $\pm 90°$. When $\lambda/\delta > 2$ the field $-\sin^{-1}(\lambda/2\delta) < \theta < \sin^{-1}(\lambda/2\delta)$ is covered with no ambiguity, but a source outside the limited field of view will appear at an erroneous position.

An ambiguity or false target may appear even if the signal source were located directly on the intersection of the axes of the planar array. Since the false target and the real target are generated by the same signal source, the processing system would have no way of distinguishing between the two. The response curve of the hydrophone array may, under adverse conditions, include side lobes of the same size as the main lobe, and this is where the ambiguity arises.

In the optical analog of the invention, there is an electromagnetic field and an object is space. A lens which is able to receive the image actually performs a Fourier transform on the image, that is, on the information across the sample space, the space where the lens is. This makes possible the formation of an image at an appropriate distance behind the lens. If a sensitive plate having an emulsion is placed at that appropriate distance, then the image becomes permanently fixed upon the plate, the intensity of the various elements of the image corresponding to the source distribution. The source distribution in this optical case, may be described by the Fourier transform, and is so described in several modern books on optics.

In summary, the optical information across the plane in free space may be described by the two-dimensional Fourier transform of the source distribution. The lens may be assumed to perform an inverse Fourier transform on that information to reconstruct the source distribution.

In the acoustic domain, there are similar wave phenomena. However, there is no direct acoustic analog to an optical lens which can focus an area of different light intensities at one point. The best that one can do is to sample the acoustic intensities at various points, the points corresponding to the location of the hydrophones. The magnitude and phase are sampled at the various hydrophones, which is equivalent to sampling the quadrature components of the input signals at the various hydrophones.

When narrow fields of view are utilized, they result in a magnified image and thus can be thought of as telephoto lens process. The camera analogy may be carried further. The hydrophone array is analogous to a mask on a lens, the field on the lens is the Fourier transform of the sources, and the camera lens performs an inverse Fourier transform to produce an image of the sources in the film plane. The function $L_{m0}$ in Eq. 5 represents the field incident in the hydrophone mask in the digital camera lens plane, and the Fourier transform in the digital computer produces the function $F(j)$ in Eq. 8 to represent the image of the acoustic sources.

The magnification of the image is a function of the spacing of the hydrophone elements for a given frequency. Inasmuch as the spacing of the hydrophones in the hydrophone array cannot be readily changed, the practical way to obtain a magnified image would be by increasing the frequency of the oscillator. This would be advantageous, for example, if some detail in the image were ambiguous or not clear. Increasing the frequency is equivalent to using a narrower beam.

However, if the frequency is increased too much, then there is a danger of causing ambiguities in the picture. If the target is acquired by first using a lower oscillator frequency, then the oscillator frequency may be increased to obtain a magnified image. The ambiguities are a function of the hydrophone spacing and the oscillator frequency.

In another analogy to the optical process, the image can be focused. This amounts to replacing Eq. 3 by a higher order approximation to Eq. 2. To terms in $1/R$, the following relation holds:

$$R_{mn} \approx R - (m\delta\beta + n\delta\lambda) + \delta^2/2R \, (m^2 + n^2) \, [1 - (m\beta + n\gamma)^2/(m^2 + n^2)] \quad (3')$$

Equation 4 is replaced by $$L_{mn} = Ce^{\frac{2\pi i}{\lambda}} \left[ \delta(m\beta+n\gamma) - \frac{\delta^2}{2R}(m^2+n^2)\left(1 - \frac{(m\beta+n\gamma)^2}{m^2+n^2}\right) \right] \quad (4')$$

Partial correction for the additional term is obtained by shifting the phase of $L_{mn}$ by $\pi\delta^2(m^2 + n^2)/(\lambda R)$. The focus is better for sources near the axis of the array because of the neglected factor $(m\beta + n\gamma)^2/(m^2 + n^2)$. This is analogous to spherical aberration in optics. The effect of the focus correction is shown in FIG. 3.

In FIG. 3, it will be observed that the sharply peaked curve does not peak at the origin. The reason for this is that the equation which this curve represents, namely Eq. 4', is an approximation to the order of $1/R$, which excludes the last squared term.

In order to form a two-dimensional image, $L_{mn}$ in Eq. 4 must be operated on with the two-dimensional finite Fourier transform. The result is $$F(j,k) = \frac{1}{(2N)^2} \sum_{m=-N}^{n-1} \sum_{n=-N}^{n-1} L_{mn} e^{-(\pi i/N)(jm+kn)} \quad (12)$$

Let $\theta_0$ again be defined by Eq. 6. Then the response to the source, represented by Eq. 4 is $$F(j,k) = \frac{-C}{N^2} \frac{\sin \pi\left(\frac{\beta}{\theta_0}-j\right) \sin \pi\left(\frac{\gamma}{\theta_0}-k\right)}{\left(e^{\frac{i\pi}{N}\left(\frac{\beta}{\theta_0}-j\right)}-1\right)\left(e^{\frac{i\pi}{N}\left(\frac{\gamma}{\theta_0}-k\right)}-1\right)} \quad (13)$$

which is the two-dimensional analog of Eq. 8. From Eq. (13), the following results:

$$|F(j,k)| = |C| \frac{\sin \pi\left(\frac{\beta}{\theta_0}-j\right)}{2N \sin \frac{\pi}{2N}\left(\frac{\beta}{\theta_0}-j\right)} \frac{\sin \pi\left(\frac{\gamma}{\theta_0}-k\right)}{2N \sin \frac{\pi}{2N}\left(\frac{\gamma}{\theta_0}-k\right)} \quad (14)$$

As may be readily seen by comparing Eq. 10 with Eq. 14, the beam patterns for the square array are the products of the two line array beam patterns.

Since all the operations on the hydrophone outputs are linear, at least to first order, the image of a distribution of sources will be the superposition of the source images.

Figure 4:
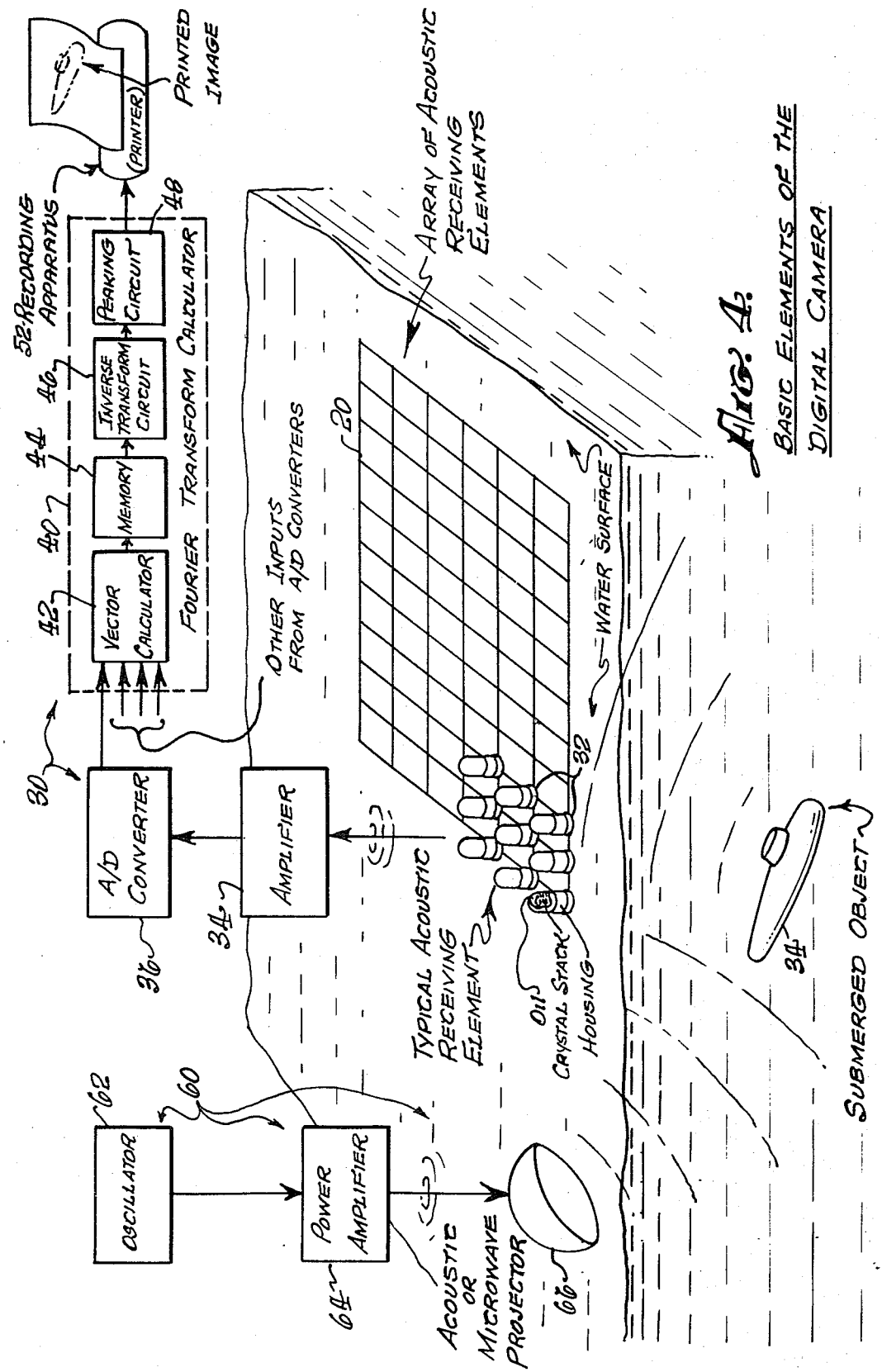
FIG. 4 is a diagrammatic view of the basic elements of the digital camera.

Referring now to FIG. 4, this figure shows a preferred embodiment of an apparatus 30, for forming an image from incident energy in the sonar to microwave range, comprising an array of acoustic receiving transducers, such as hydrophones 32, consisting of at least one row of transducers, for receiving the incident energy, the directivities of all of the transducers being parallel. An amplifier 34, whose input is connected to the output of a hydrophone 32, amplifies the received signals. An analog-to-digital (A/D) converter 36, whose input is connected to the output of the amplifier 34, samples the input signals and converts them into a series of digital pulses, to form words of binary information.

A transform calculator 40, whose input is connected to the output of the A/D converter 36, comprises a vector calculator 42, connected to the A/D converter, which determines the complex numbers which represent the magnitude and phase of each frequency of the words of binary information received from the A/D converter. A memory 44, connected to the vector calculator 42, stores the words of information representing the series of complex numbers. An inverse transform circuit 46, connected to the memory 44, performs an inverse transform on the words of information, to result in a second series of complex numbers. A peaking circuit 48, connected to the inverse transform circuit 46, determines the absolute value of each complex number, the assembly of absolute values forming the representation of the image of the object.

A recording apparatus, such as a printer 52, connected to the peaking circuit 48, displays the relative magnitudes of the complex numbers.

In the apparatus shown in FIG. 4, the array of receiving transducers may comprise a plurality of rows of transducers, the array thereby being rectangular.

The transform calculator 40 generally is a Fourier transform calculator and the inverse transform circuit 46 is a discrete finite Fourier transform circuit. In the specific embodiment herein described, the discrete finite Fourier transform circuit is a fast Fourier transform circuit.

If the target being sought is not self-radiant, the apparatus 30 will also incorporate the transmitting equipment 60, including an oscillator 62 capable of operating at some frequency in the sonar to microwave range, and a power amplifier 64, connected to the oscillator, for amplifying the oscillator output.

It should be noted that, although FIG. 4 implies that there is one amplifier 34 for each hydrophone 32, a multiplexing arrangement could be used at the input to a single amplifier. The transmitting equipment 60 also includes a projector 66, connected to the power amplifier 64, for amplifying the oscillator frequency and projecting the amplified energy against a target 34, thereby causing the reflected energy to be incident upon the array of hydrophones 32. The oscillator 62 may be capable of operating over a band of frequencies, with the result that an increase in the operating frequency results in an amplified image.

The apparatus 30 may comprise only one amplifier 34, and further include a multiplexing arrangement, not shown, connected to each of the receiving transducers 32 and the amplifier, for successively connecting the amplifier to each of the hydrophones. On the other hand, the apparatus 30 may comprise a number of amplifiers 34, connected to and equal to the number of receiving transducers 32. With the use of integrated circuitry, having an amplifier 34 for each hydrophone 32 presents no great technical problem.

Referring now to FIG. 5, the acoustic simulation computes a set of complex numbers to represent the amplitude and phase of the pressure variation which exists at the location of each hydrophone in the lens array in an acoustic field generated by a set of point sources. A lens may be considered to consist of individual receiving elements, each called a lens element, the assembly of elements forming a lens array. Each hydrophone may be considered to be an analog of a lens element. The acoustic medium is assumed to be noise-free, isotropic and homogenous, and all propagation losses are ignored. Detailed information on propagation of sound in complicated acoustic environments is not available in the minute detail that would be required for exact simulation, therefore acoustic simplifications were used to allow easy computation of a sound field which will demonstrate the digital camera operation.

The simulation herein disclosed avoids the uncertainty in the acoustic reflectivity of real objects by calculating the acoustic field produced by a set of monochromatic point sources. In the idealized medium there is no transmission loss from source to lens element position so that the amplitude is unchanged. The phase shift is determined by the straight line distance, in wavelengths, from source to lens element position. At each lens element position the pressure is the sum of sinusoidal pressure variations from each source. The simulation is accomplished by representing each source as a complex number, multiplying the representation of each source by a complex exponential to give the phase shift and then taking the complex sum for all sources. Assuming a unit source on the $x$-axis of the array, as shown in FIG. 1, then all hydrophones at the same symmetrical distance from the origin will have a received signal having the same magnitude and phase angle. For example, the hydrophones at the points $(0, 2\delta, 2\delta)$, $(0, -2\delta, 2\delta)$, $(0, -2\delta, -2\delta)$ and $(0, 2\delta, -2\delta)$ will all have the same phase and amplitude with respect to the unit source. A complex number with real part of one and zero imaginary part, representing a plane wave of unit amplitude arriving on the axis of the camera, is added to the sum at each lens element position. This number is used in the simulation to provide a reference at the center of the constructed image. It is not necessary for the camera operation.

The lens array may be simulated by idealized omnidirectional hydrophones 32, in a square array with uniform spacing $\delta$ between elements. The hydrophones have associated amplitude and phase measuring electronics, in Fourier transform calculator 40, in an operational system. Measurement was not simulated in the results described here, but the acoustic phase and amplitude calculated as complex numbers at the hydrophone element locations were used directly as inputs to the digital camera.

Referring now to FIG. 5, which shows a basic simulation program 70, the digital camera 80 which consists of a digital scheme for centering 82 the image, a fast Fourier transform 84 to convert the lens plane information to an image, and a display scheme 86 to present the image for viewing. The camera was not simulated, it was implemented directly as a digital camera program in a UNIVAC 1108.

An excellent review article describing the main characteristics and uses of the fast Fourier transform appears in the July 1969 issue of the IEEE Spectrum, pages 41–52, in an article entitled "A Guided Tour of the Fast Fourier Transform" by G. D. Bergland.

Essentially, the fast Fourier transform is a discrete Fourier transform wherein the specific number of discrete elements is predetermined, the specific algorithm for determining the transform depending upon the number, $2N$ in this invention, of elements chosen. Use of the fast Fourier transform has the enormous advantage that the number of calculations involved are less by an exponential factor over the number required using the standard discrete Fourier transform.

The image is centered in simulation by applying a 180° phase shift to the signal from every other hydrophone in the lens array, or by multiplying the complex representation of every other signal by $a -1$. The need for this arises from the peculiarity of indexing of the Fourier transform. A symmetrical function would be indexed from $-N$ to $+N$. For simulating the digital camera by a computer, this presents difficulties, inasmuch as the computer calculates from 1 to $2N$. This applies to the conventional discrete Fourier transform, and would therefore apply to the fast Fourier transform.

Since the point energy sources are at different distances from a specific hydrophone, each point source would contribute a sine wave signal at each specific hydrophone having a different magnitude and phase angle, depending on the range of a specific point source.

The one-dimensional digital fast Fourier transform is used to transform each row and then to transform each column of complex numbers from the lens array, and the image intensities in each resolution element of the picture are formed by taking the absolute value of the transformed array.

The number that is obtained by taking the Fourier transform is a complex number having a magnitude and a phase angle. However, only the magnitude of this number is utilized, the magnitude being proportional to the number of points at a specific area of the printed image.

In the summation involving taking the transform, the various contributions from all the signal sources are complex numbers, each having a magnitude and phase angle. These complex numbers are added vectorially, so that the phase angles are used at an intermediate step, but not in the final step. The resultant picture may be displayed on a printer such as the Stromberg-Carlson 4020 equipment, available for use with the UNIVAC 1108 computer. The picture is composed of a square array of boxes with a plotted number of points proportional to the image intensity for that box. The points are placed at random inside each box to provide a grey scale of intensity variation in the final picture.

FIG. 6 shows the set of points used to represent a submarine shape.

FIGS. 7 through 9 show a set of pictures made with a simulated distance to the submarine shape of 3,500 feet, a frequency of 25 kHz, a sound velocity of 5,000 ft/sec, and lens hydrophone elements separated by 0.5 wavelength. The submarine is moved across the field of view between frames. It will be noticed that the object is clearly not a point, but the angular size of a submarine at this range does not cover many resolution elements.

FIGS. 10 through 12 show a set of submarine shape pictures made with the hydrophone elements separated by 1 wavelength, other dimensions remaining the same. Note that the submarine appears to be magnified. The simulated submarine was not moved across as large an angular region as in FIG. 7 through 9.

FIGS. 13 through 15 are a set of submarine shape pictures made with the hydrophone elements separated by 2 wavelengths. Other dimensions remain the same. The submarine shape is now magnified enough to allow recognition of the shape. Again, the submarine was not moved across as large an angular region as in FIGS. 10 through 12.

The stripes that appear in some pictures, particularly FIGS. 13 and 14, are due to spurious responses and interference between adjacent sources. The angular distance is what is important in respect to resolution. If there were more points in the point source set, the striping effect shown in some of the figures would not be evident.

While offhand it might be supposed that a received image having greater definition would always be obtained if there were more point sources in FIG. 6, this is not necessarily the case. From FIGS. 7 through 10, it may be seen that the general shape of the point source set shown in FIG. 6 is obtained, but if the points were closer together, they would be within the resolution level of the Fourier transform.

An improved resolution could be obtained if the set of point sources represented by FIG. 6 were closer to the hydrophone array 10, that is, if the target were at closer range. A hydrophone array having an increased number of hydrophones would also give an acoustic signal having greater resolution.

Large spacing between lens elements 32 produces ambiguity in images of source sets that are too far from the camera axis, and therefor is used only for submarine shapes near the axis.

One of the limitations as to the range of frequencies at which the invention is practical is usability of the transducers of the hydrophones at the higher frequencies. At this time, it would appear that the invention is limited to the high end of the acoustic frequency spectrum and to microwave frequencies.

A frequency of 25 kHz seems to be a reasonable compromise between increasing propagation loss at high frequency and increasing array size at low frequencies. The results obtained in FIGS. 7 through 9 would require an array 6 feet square for a sound velocity of 4,750 ft/sec. While FIGS. 10 through 12 would require an array 12 feet square, and FIGS. 13 through 15 would require an array 24 feet square, it would be possible to build a system with these arrays combined on a single frame.

It should be noted that the hydrophone elements mounted in a rigid frame would have spacing correct for only one velocity of sound. Conditions different from the design velocity and frequency result in a field of view and magnification slightly different from the design.

When the digital Fourier transform scheme is used for determining phase and amplitude from each element, there is a simultaneous determination of the phase and amplitude of each frequency in the sampled waveform. Each frequency can be used to contribute to the image intensity if desired.

The sampled time function from each element could be processed to select the desired portion or characteristic of a time-varying signal for processing. Thus the camera could be extended to work for frequency scan or pulse transmissions.

It should be emphasized that the imagining technique described may have application in many wave fields including underwater sound, medical examination, material testing and inspection, radio astronomy, even transmission of pictures from microwave display array to microwave lens plane arrays.

As mentioned hereinabove, a ping-type projector could be used instead of the continuous wave oscillator 62. The projector has the advantage that, by gating the input signal, signals due to reverberation may be partially or completely eliminated, by taking into consideration the range of the target.

The digital computer is described as a general-purpose computer, but it may use an auxiliary computer which is hard wired to perform the finite Fourier transform. The image may be output to devices other than a printer; for example, the images have been output to a Stromberg-Carlson 4020 Plotter; images could be output to a Calcomp Plotter, or to a special purpose display console. The time functions from each typical element amplifier could be processed by an analog device such as a Hewlett-Packard Vector Voltmeter to determine amplitude and phase of the typical signal for input to the digital computer, which would then bypass the Fourier analysis for determining amplitude and phase.

Obviously many modifications and variations of the present invention are possible in the light of the above teachings. It is therefore to be understood that within the scope of the appended claims the invention may be practiced otherwise than as specifically described.

What is claimed is:

1. An apparatus for forming an image from incident energy in the sonar to microwave range, comprising:
    an array of acoustic receiving transducers, such as hydrophones, consisting of at least one row of transducers, for receiving the incident energy, the directivities of all of the transducers being parallel;
    an amplifier, whose input is connected to the outputs of said receiving transducers, for amplifying the received signals; an analog-to-digital (A/D) converter, whose input is connected to the output of the amplifier, for sampling the input signals and converting them into a series of digital pulses, to form words of binary information;

a transform calculator, whose input is connected to the output of the A/D converter, comprising:
a vector calculator connected to the A/D converter, which determines the complex numbers which represent the magnitude and phase of each frequency of the words of binary information received from the A/D converter;
- a memory, connected to the vector calculator, which stores the words of information representing the series of complex numbers;
- an inverse transform circuit connected to the memory, which performs an inverse transform on the words of information, to result in a second series of complex numbers;
- a peaking circuit, connected to the inverse transform circuit, which determines the absolute value of each complex number, the assembly of absolute values forming the representation of the image of the object; and
- a recording apparatus, such as a printer, connected to the peaking circuit, which displays the relative magnitude of the complex numbers.

2. An apparatus according to claim 1, wherein the array of receiving transducers comprises a plurality of rows of transducers, the array thereby being rectangular.

3. An apparatus according to claim 2, wherein the transform calculator is a Fourier transform calculator; and
the inverse transform circuit is a discrete finite Fourier transform circuit.

4. An apparatus according to claim 3, wherein the discrete finite Fourier transform circuit is a fast Fourier transform circuit.

5. An apparatus according to claim 4, further comprising
an oscillator, capable of operating at some frequency in the sonar to microwave range; and
a projector, connected to the oscillator, for projecting energy against a target, thereby causing the reflected energy to be incident upon the array of hydrophones.

6. An apparatus according to claim 5, wherein the oscillator is capable of operating over a band of frequencies, with the result that an increase in the operating frequency results in an amplified image.

7. An apparatus according to claim 6, comprising:
only one amplifier; and further comprising:
a multiplexing arrangement, connected to each of the receiving transducers and the amplifier, for successively connecting the amplifier to each of the hydrophones.

8. An apparatus according to claim 6, further comprising:
a number of amplifiers connected to and equal to the number of receiving transducers.

9. An apparatus according to claim 5, further comprising:
a power amplifier whose input is connected to the output of the oscillator, for amplifying the output frequency of the oscillator.

10. An apparatus for forming an image from incident energy received from a target, in the sonar to microwave range, comprising:
an array of acoustic receiving transducers, such as hydrophones, consisting of at least one row of transducers, for receiving the incident energy, the directivities of all of the transducers being parallel;
an analog-to-digital (A/D) converter, whose input is connected to the receiving transducers, for sampling the input signals and converting them into a series of digital pulses, to form words of binary information;
means whose input is connected to the output of the A/D converter for determining the complex numbers which represent the magnitude and phase, at a frequency of interest, of the words of binary information received from the A/D converter;
means connected to the determining means for storing the words of information representing the series of complex numbers; and
means connected to the storing means for inversely transforming the words of information, to result in a second series of complex numbers; and
means connected to the inverse transforming means for determining, from the inversely transformed words, a set of absolute values, one value for each complex number, the set of values corresponding to the intensities of the signal sources of various parts of the target.

11. The apparatus according to claim 10, further comprising:
a recording apparatus, such as a printer, connected to the output of the second-named determining means, which displays the relative intensities of the signal sources of various parts of the target, the totality of intensities forming a pictorial representation of the target.

12. An apparatus according to claim 10, wherein the array of receiving transducers comprises a plurality of rows of transducers, the array thereby being rectangular.

13. An apparatus according to claim 12, wherein the first-named determining means is a Fourier transform calculator; and
the inverse transforming means is a discrete finite Fourier transform circuit.

14. An apparatus according to claim 13, wherein the discrete finite Fourier transform circuit is a fast Fourier transform circuit.

* * * * *